(12) United States Patent
Liu et al.

(10) Patent No.: US 7,940,609 B2
(45) Date of Patent: May 10, 2011

(54) SYSTEM FOR DUPLICATION OF DATA ONTO DISKS

(75) Inventors: Ming-Hsun Liu, Taipei (TW); Chung-Hsuan Tsai, Taipei (TW)

(73) Assignee: Datatronics Technology, Inc., Taipei (TW)

( * ) Notice: Subject to any disclaimer, the term of this patent is extended or adjusted under 35 U.S.C. 154(b) by 49 days.

(21) Appl. No.: 12/626,847

(22) Filed: Nov. 27, 2009

(65) Prior Publication Data
US 2010/0067345 A1 Mar. 18, 2010

Related U.S. Application Data

(63) Continuation-in-part of application No. 11/619,764, filed on Jan. 4, 2007, now abandoned.

(51) Int. Cl.
*G11B 21/08* (2006.01)
(52) U.S. Cl. .............. 369/30.81; 369/30.05; 369/30.19; 369/183; 369/222
(58) Field of Classification Search .............. 369/30.81, 369/30.05, 30.19, 30.33, 30.36, 30.55, 30.77, 369/53.22, 292; 720/601, 605
See application file for complete search history.

(56) References Cited

U.S. PATENT DOCUMENTS

| | | | | |
|---|---|---|---|---|
| 5,781,523 A * | 7/1998 | Ozawa et al. | ................. | 720/605 |
| 5,818,802 A * | 10/1998 | Menke et al. | ............... | 369/30.55 |
| 6,141,298 A * | 10/2000 | Miller | ........................ | 369/30.33 |
| 6,490,232 B2 * | 12/2002 | Sato | .......................... | 369/30.34 |
| 7,092,337 B2 * | 8/2006 | Butler et al. | ............... | 369/53.22 |
| 7,227,816 B2 * | 6/2007 | Weisser et al. | ............. | 369/30.77 |
| 7,448,051 B2 * | 11/2008 | Nelson et al. | ................. | 720/601 |
| 2001/0009534 A1* | 7/2001 | Sato | ............................... | 369/34 |
| 2002/0172108 A1* | 11/2002 | Moreira et al. | ........... | 369/30.36 |
| 2003/0002400 A1* | 1/2003 | Klein | ......................... | 369/30.55 |
| 2003/0152001 A1* | 8/2003 | Butler et al. | ............... | 369/53.22 |
| 2005/0213494 A1* | 9/2005 | Nelson et al. | ................. | 369/292 |
| 2007/0076537 A1* | 4/2007 | Klein | ......................... | 369/30.55 |

* cited by examiner

*Primary Examiner* — Thuy N Pardo

(57) ABSTRACT

A system for duplication of data onto disks includes a housing, a drawer device, a transport mechanism, a set of disk holders, an arm and a control device. The housing includes a printing device and a set of copy units. The transport mechanism is connected to the arm for moving individual disks between the disk holders, the drawer device and the set of copy units. The control device automatically controls the various functions of various components of the system for duplication.

19 Claims, 18 Drawing Sheets

SYSTEM FOR DUPLICATION OF DATA ONTO DISKS

This application is a continuation of part of U.S. patent application Ser. No. 11/619,764, which claims the benefit of the earlier filing date of Jan. 4, 2007 now abandoned. Claim 1 of this application is revised from the previous Claim 1 of the U.S. patent application Ser. No. 11/619,764, Claim 2 of this application is revised from the previous Claim 9 of the U.S. patent application Ser. No. 11/619,764, Claim 3 of this application is new, Claim 4 of this application is revised from a combination of the previous Claims 3-7 of the U.S. patent application Ser. No. 11/619,764, Claims 5-9 of this application are new, Claim 10 of this application corresponds to the previous Claim 2 of the U.S. patent application Ser. No. 11/619,764, Claims 11-14 of this application are new, claims 15-16 of this application correspond to the previous Claim 19 of the U.S. patent application Ser. No. 11/619,764, Claims 17-18 are revised from the previous Claim 20 of the U.S. patent application Ser. No. 11/619,764, Claim 19 of this application is new.

BACKGROUND OF THE INVENTION

1. Field of the Invention

The present invention relates to a system for duplication of data onto disks and a method of the same. More particularly, the present invention is directed toward an apparatus and process for automatically reproducing or recording and printing possible optical media disks such as CD-ROMS, compact disks, etc. In addition to these, this invention relates also a transport mechanism and an arm for lifting and transporting a recorded/reproduced compact disk form the stacked compact disks of a disk holder to a tray/drawer device of duplicating device or a printing device.

2. Description of the Prior Art

Optical disks, are so-called compact disks (CDs), contain digital data such as music, text, video, computer programs, etc. that can be read out or written in by laser beams. Optical disks have been extensively used as a medium to store or replicate the aforementioned digital data.

In general, the transfer of data onto compact disks by a stamping process was economically feasible only when manufacturing a large quantity of copies. Even though low-cost disk readers were readily available, users who required frequent data updates or required relatively few copies could not get the benefits of this kind of data transfer technology. Thus, a variety of automatic disk reproducing apparatuses/devices, which are used for holding a quantity of stacked disks and to transport a disk to a desired position or location where the disk may be burned and otherwise manipulated, are now commercially available.

For small business users, burners are another solution to replicate disks when there only several or tens of disk copies are needed.

U.S. Pat. No. 6,141,298 discloses a programmable self-operating compact disk duplication system. The compact disk duplication system comprises multiple burners that are stacked one on another, and a pivotal transport tower with an arm that moves upwardly and downwardly. The arm on the pivotal transport tower moves and transports the disks including the master disk, unrecorded disks or recorded disks among the burners and disk spindle members. However, the mechanical structure of the aforementioned system is sophisticated, which causes high manufacturing costs. Besides, the aforementioned system is bulky and occupies a large storage space that is inconvenient to be packaged and/or transported.

U.S. Pat. No. 6,490,232 discloses a compact disk feeder. The compact disk feeder comprises a transfer device that elevates and spins an arm to move unrecorded compact disks from a disk holder to the tray of a printer to print the cover of the disk. After the printing operation of the cover is completed, the arm removes the printed disk from the tray of the printer and transports the printed disk to another disk holder. Likewise, the aforementioned compact disk feeder is bulky, and hence is inconvenient to package or transport.

Further, the aforementioned compact disk feeder uses the arm to remove a single disk from a stack of compact disks and transport the disk to the tray of the printer or the burner. The mechanical structure of the arm and the automatic control system of the arm are complex. The arm also requires and occupies a large area to move, which makes the aforementioned compact disk feeder inconvenient to use.

Therefore, there is a need to provide an improved automatic compact disk reproducing/printing apparatus to mitigate or obviate the aforementioned problems.

SUMMARY OF THE INVENTION

An object of the present invention is to provide a system for duplication of data onto disks and a method of the same. The system for duplication of data onto disks is compact and composed as an automatic compact disk reproducing/printing apparatus.

An embodiment of a system for duplication of data onto disks in accordance with the present invention includes a housing, a drawer device, a transport mechanism, a set of disk holders, an arm and a control device. A print device and a set of copy units are mounted in the housing. The transport mechanism is connected to the arm for moving individual disks between the disk holders, the drawer device and the set of copy units. The control device automatically controls the various functions of various components of the system for duplication.

The transport mechanism comprises a set of casing, a threaded rod, a set of power transmission members and a conveying device. The set of power transmission members is coupled to a driving unit. The threaded rod is rotated by the set of power transmission members through the driving unit as the power device is turned on. The transport mechanism comprises a front casing, a rear casing, a top cover and a sliding plate. The front casing has an opening near its top edge. A lengthwise slot is formed between the front casing and rear casing. The conveying device is up and down rotary mounted on the threaded rod. The arm is coupled to the conveying device so that the arm can be moved along the lengthwise slot and the opening.

The arm moves compact disk at the top of the stack of compact disks and transports the compact disk fall onto the tray or the drawer device. The fallen compact disk is received on the tray of the duplicating device or the drawer device of the printer. The tray or the drawer device with the compact disk is retracted to duplicate or print. After the duplication or printing, the tray or the drawer device with the recorded compact disk is ejected. The arm elevates the recorded/reproduced compact disk from the tray or the drawer device so that the tray or the drawer device can be retracted again. In addition, the arm conveys the recorded/reproduced compact disk to another disk holder.

Since the mechanical component using a transport mechanism and an arm lift and transport a compact disk form the stacked compact disks of a disk holder to a tray/drawer device of duplicating device or a printing device, and after the duplication or printing, lift and transport a recorded/reproduced compact disk form the tray/drawer device of duplicating device or printing device to another disk holder. Thus, the apparatus is compact and is convenient to use.

In addition, the apparatus is also convenient to transport or store because of its compact form. The main components of the apparatus can be easily demounted, therefore, the apparatus is benefit to manufacture, repair and upgrade.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENTS

Figure 1:
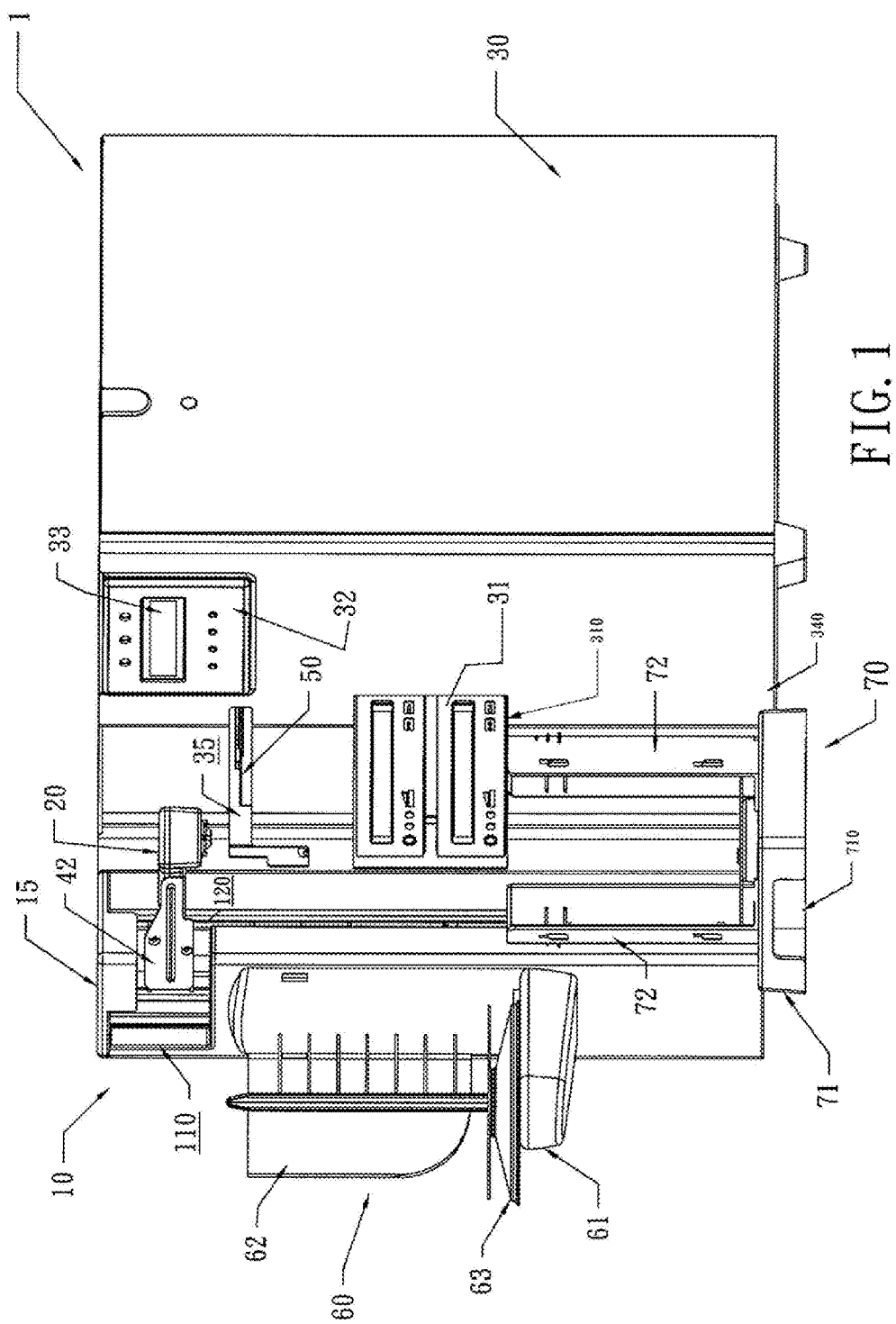
FIG. 1 is a front view of an embodiment of a system for duplication of data onto disks in accordance with the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of a system for duplication of data onto disks in accordance with the present invention are provided. The duplication system comprises a housing, a drawer device, a transport mechanism, a set of disk holders, an arm and a control device. The arm is movably mounted on the transport mechanism. At least one copy unit and a printing device are mounted in the housing. The drawer device is mounted in the printing device. The copy unit may be a duplicating device with a tray. The drawer device and the tray both have an ejected position and a retracted position. The drawer device or the tray of copy unit is under the arm when the drawer device or tray is at the ejected position. One of the disk holders holds a stack of unrecorded compact disks and the arm picks up a single compact disk onto the tray or the drawer device to be duplicated or printed after the tray or the drawer device with the compact disk moves to its retracted position. After duplication or printing, the tray or the drawer device moves to its ejected position again, and the recorded or printed compact disk is removed from the tray or drawer device and conveyed to the drawer device or another disk holder by the arm.

Figure 6:
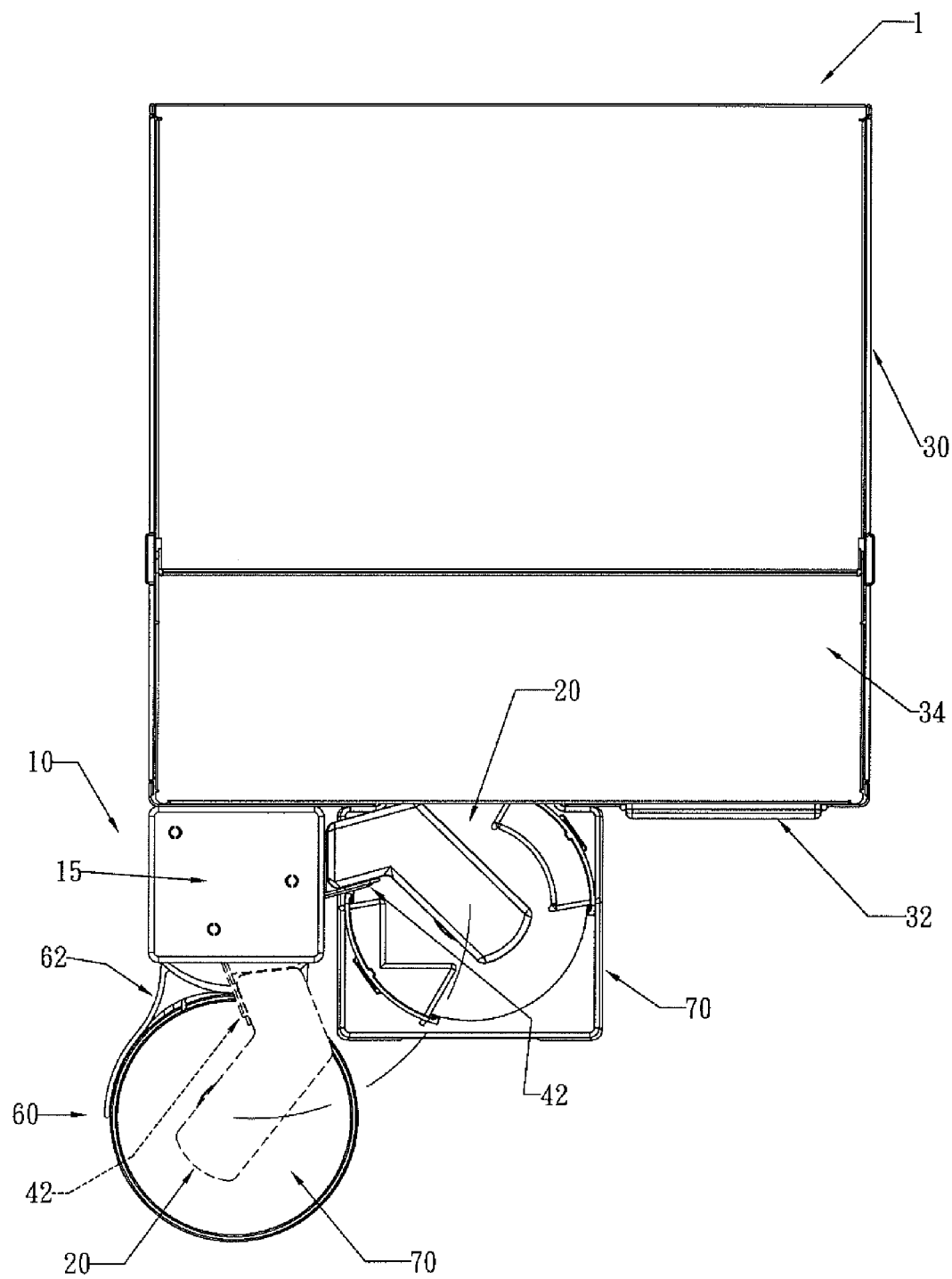
FIG. 6 is a top view of embodiment of a system for duplication of data onto disks when the arm is by operating.

Referring to FIG. 1 and FIG. 6, an embodiment of an automatic compact disk reproducing apparatus 1 in accordance with the present invention is illustrated. The apparatus 1 comprises a transport mechanism 10, an arm 20, a housing 30, a conveying device 40, a drawer device 50 and at least two disk holders 60, 70. A control device is mounted inside the housing 30 and connected to the drawer device 50, the conveying device 40 and the arm 20 for controlling the drawer device 50, the conveying device 40 and the arm 20. The control device is connected to a main computer for transmitting electronic signals.

A print device and a set of copy units are mounted inside the housing 30. The copy units are duplicating devices 31. At least one of the duplicating devices 31 is a burner. The housing 30 has a panel 32 which comprises a display device 33 and several buttons. The panel 32 is pivotally mounted on the housing 30. The housing 30 further has a cover plate 34 for maintaining the printing device. As this embodiment shows, the panel 32 is mounted on the front side of the housing 30, and the cover plate 34 is on the top side of the housing 30. The location or position of the panel 32 and the cover plate 34 are according to the design of the apparatus 1. The housing 30 further comprises a through hole 35, and the drawer device 50 is assembled in the housing 30 and aligned with the through hole 35, so that the drawer device 50 can extend out of the housing 30 through the through hole 35.

Referring to FIGS. 2-6, the transport mechanism 10 is mounted on the housing 30 and comprises a set of casings, a threaded rod 13, a set of power transmission members 14 and a conveying device 40. The set of power transmission members 14 are coupled to a driving unit 126 and disposed on the casings. The threaded rod 13 is rotated by the set of power transmission members 14 through the driving unit 126 as the power device is turned on. The set of casings of the transport mechanism 10 comprise a front casing 11, a rear casing 12, a top cover 15 and a sliding plate 16. The front casing 11 has an opening 110 near its top edge. The front casing 11 and the rear casing 12 are oppositely arranged, and a vertical slot 120 is formed between the front casing 11 and rear casing 12. The conveying device 40 is up and down rotary mounted on the threaded rod 13. The arm 20 is coupled to the conveying device 40 so that the arm 20 can be moved along the vertical slot 120 and the opening 110. The top cover 15 is covered on the top ends of the front and the rear casings 11, 12, and one end of the threaded rod 13 is pivotally connected to the top cover 15 while the other end of the threaded rod 13 is drivingly connected to the set of power transmission members 14. The front casing 11, the rear casing 12, the top cover 15 and the sliding plate 16 can be made of the same material or different materials for reducing manufacturing costs.

Inside the rear casing 12 are defined a sliding slot 122 and a gliding slot 124. The sliding plate 16 has a lengthwise slot 160 and a ranking slot 162. The lengthwise slot 160 is fitted with the sliding slot 122. The sliding slot 122, the lengthwise slot 160 and the ranking slot form a sliding rail of the transport mechanism 10.

The conveying device 40 includes a fixing plate 42 for the arm 20 and a conveying element 43. The conveying element 43 has a spiral ridge 430 and a combination plate 434 fitted to the threaded rod 13. The fixing plate 42 and the combination plate 434 are mounted on both sides of the conveying element 43. The fixing plate 42 is connected to the arm 20 and extends out of the vertical slot 120. The conveying element 43 moves pivotally and respectively along the threaded rod 13. The conveying element 43 has a protrusion 432 fitted to the sliding rail. According to the conveying element 43, the threaded rod 13 and the set of power transmission members 14, the arm 20 moves respectively along the sliding slot 122 and the lengthwise slot 160 and pivotally along the ranking slot 162.

The conveying device 40 further comprises a gliding element 41 and a damping element 45. The gliding element 41 is fitted to the conveying element 43. The damping element 45 is mounted on the gliding element 41. The gliding element 41 has a protruding part 414 fitted to the gliding slot 124. According to the gliding element 41 and the gliding slot 124, the conveying element 43 moves smoothly by its vertical movement. In this embodiment, the gliding element 41 has two extending plates 410 and 412 fitted onto both sides of the conveying element 43. The damping element 45 is mounted on the extending plate 410 and fitted to a mating part 435 of the conveying element 43 for reducing the collision of the arm 20 during its pivotal movement.

Figure 2:
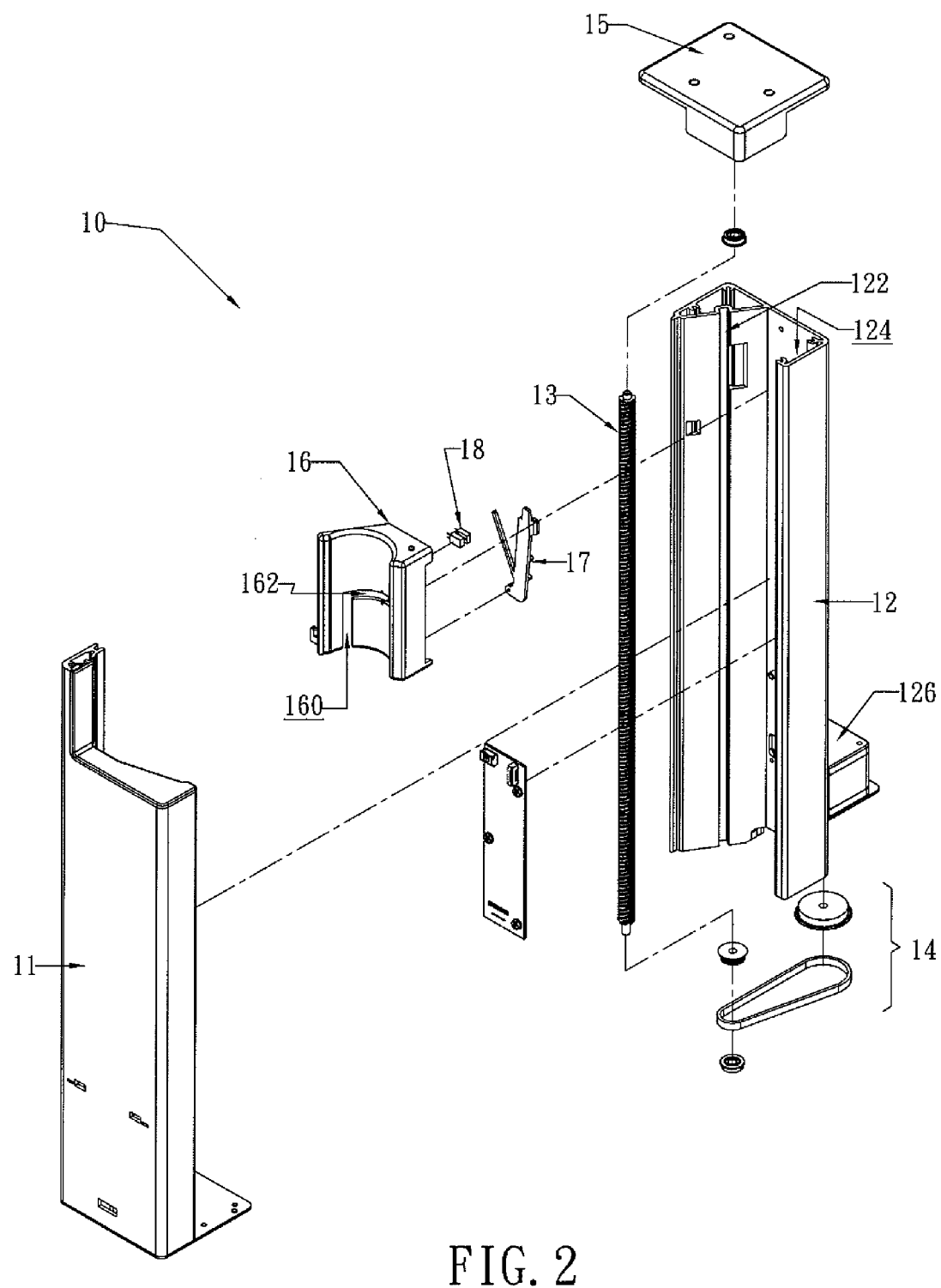
FIG. 2 is an exploded perspective view of a transport mechanism of a system for duplication of data onto disks in accordance with the present invention.
Figure 3:
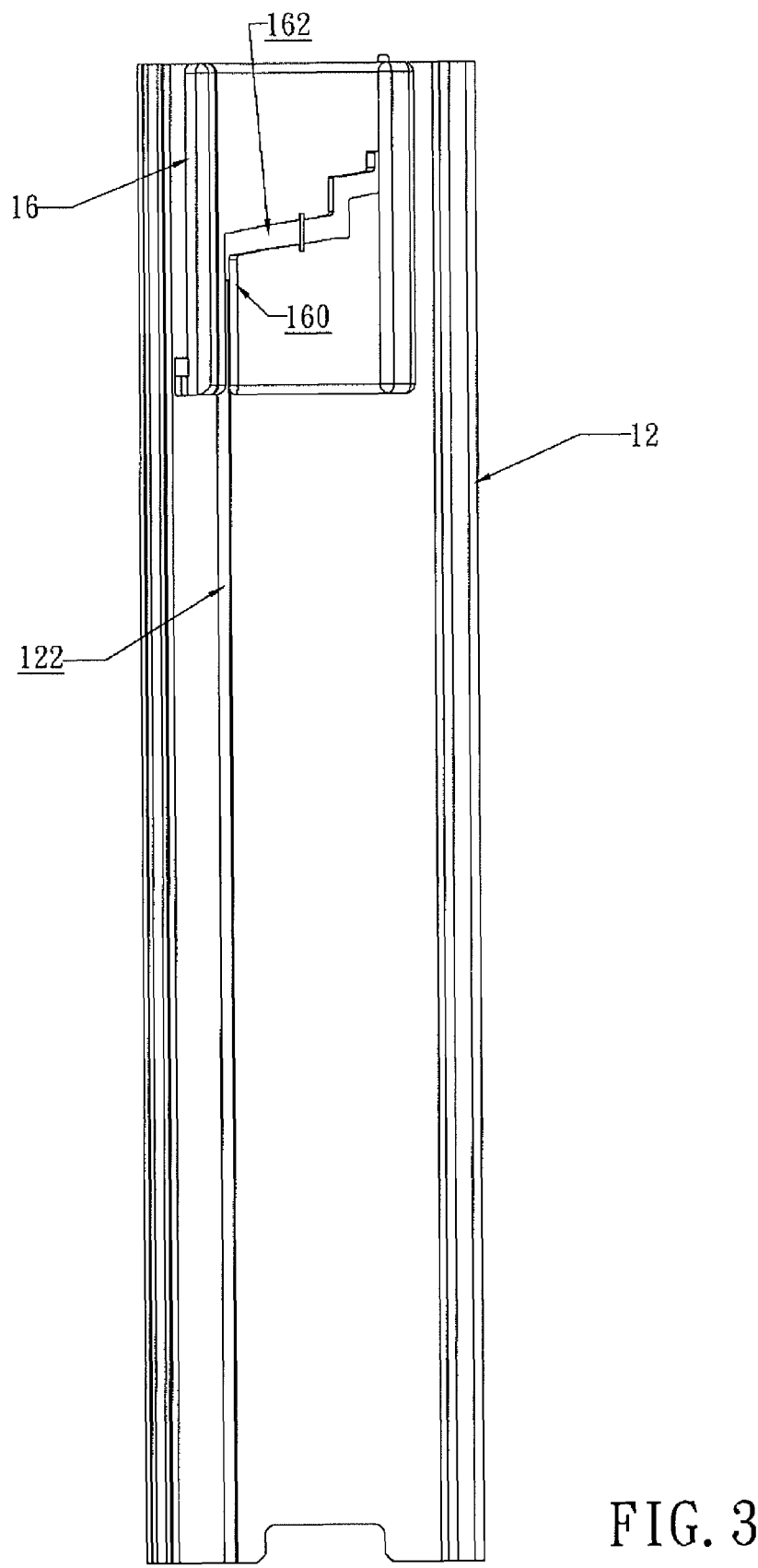
FIG. 3 is a front view of a back casing of the transport mechanism in FIG. 2.
Figure 4:
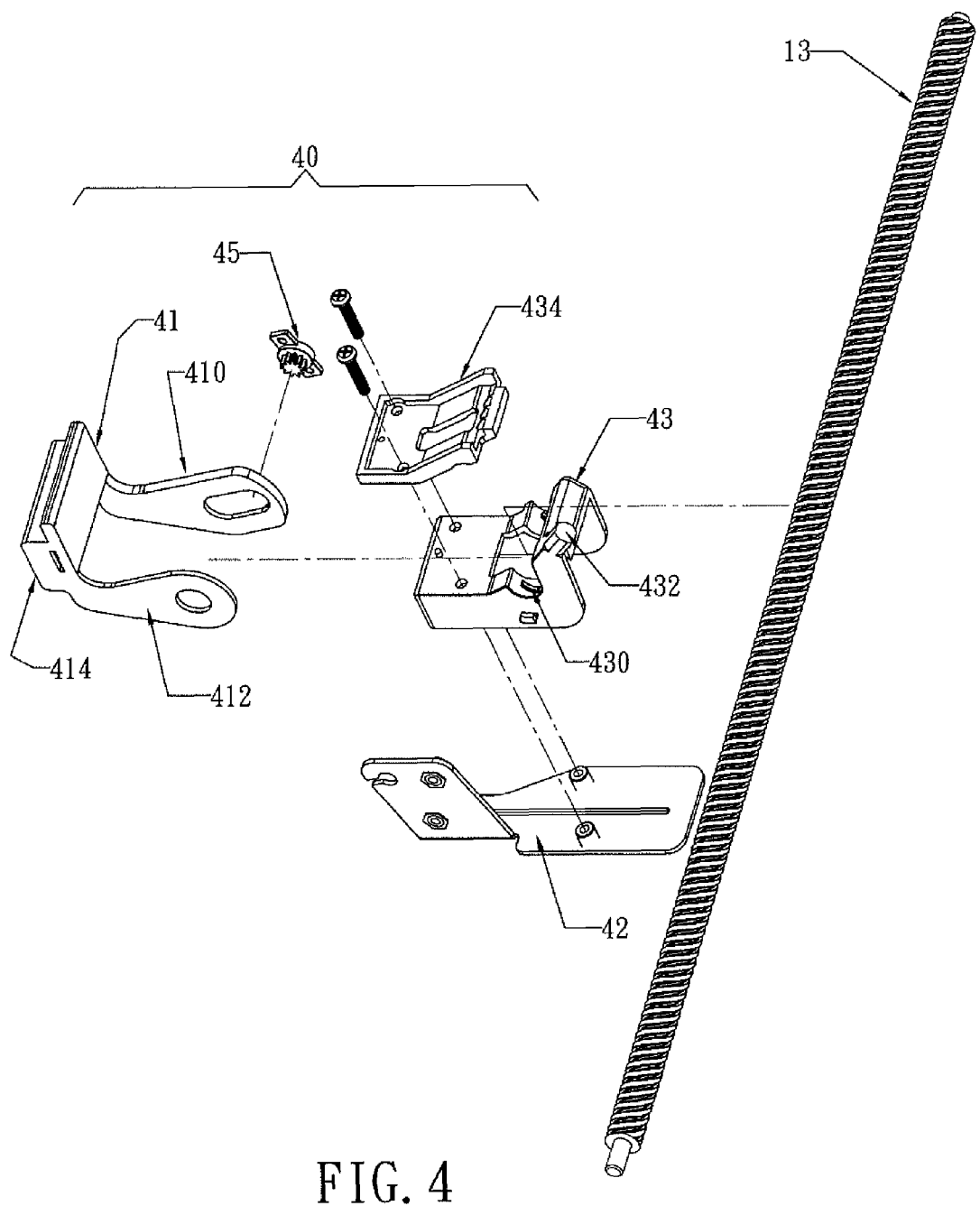
FIG. 4 is a perspective view of the transport mechanism in FIG. 2 when the casings of the transport mechanism are removed.
Figure 5:
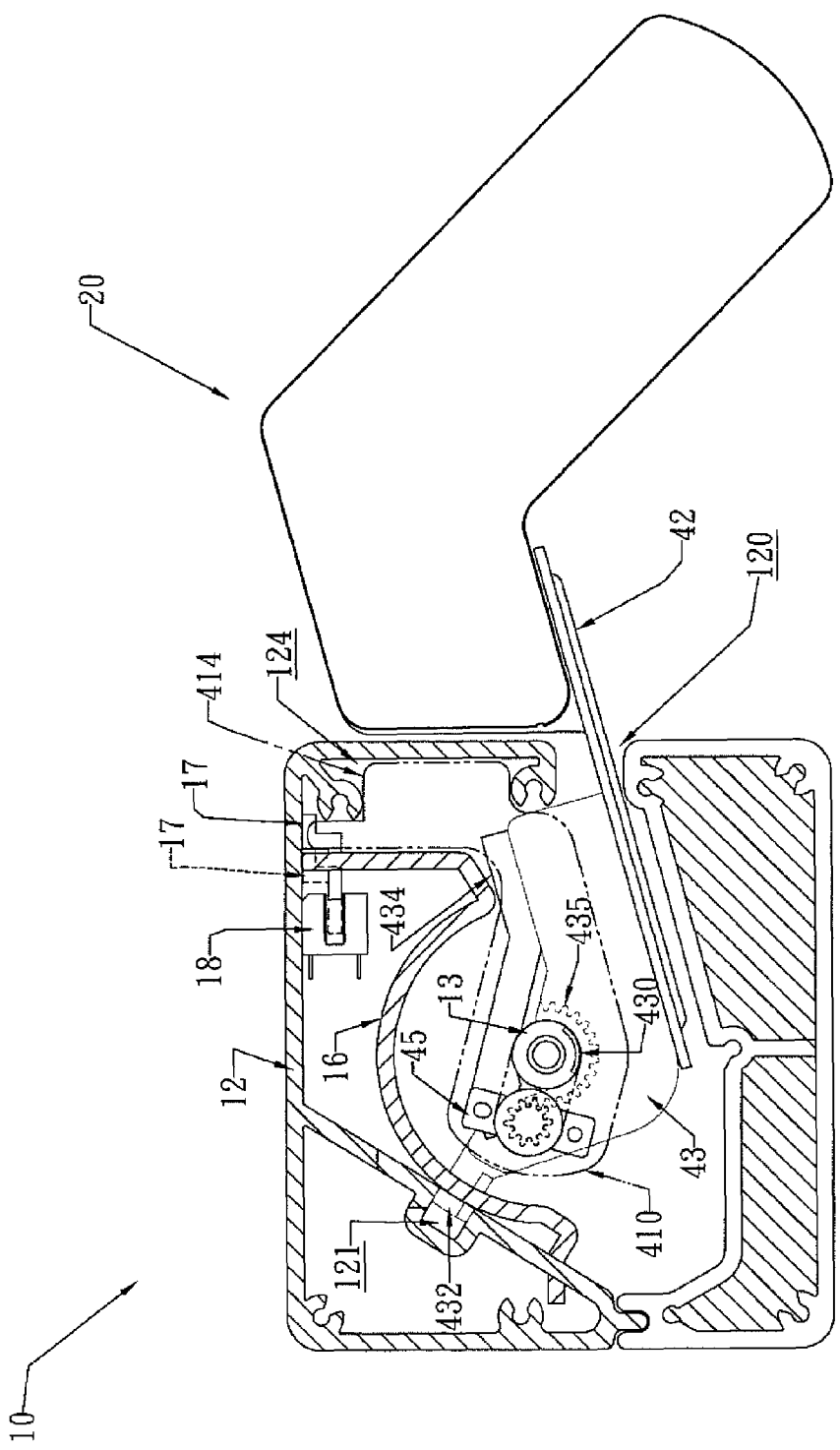
FIG. 5 is a top view of an arm mounted in transport mechanism in FIG. 2 when the top cover of the transport mechanism is removed.

Referring to FIG. 2 and FIG. 5, the gliding slot 124 of the rear casing 12 further comprises a sensor 18 and a fitting member 17 for the sensor 18. When the fitting member 17 is touched, the sensor 18 will give a signal for reducing the upward movement of the arm 20 by nearing the top of the transport mechanism 10.

Figure 7:
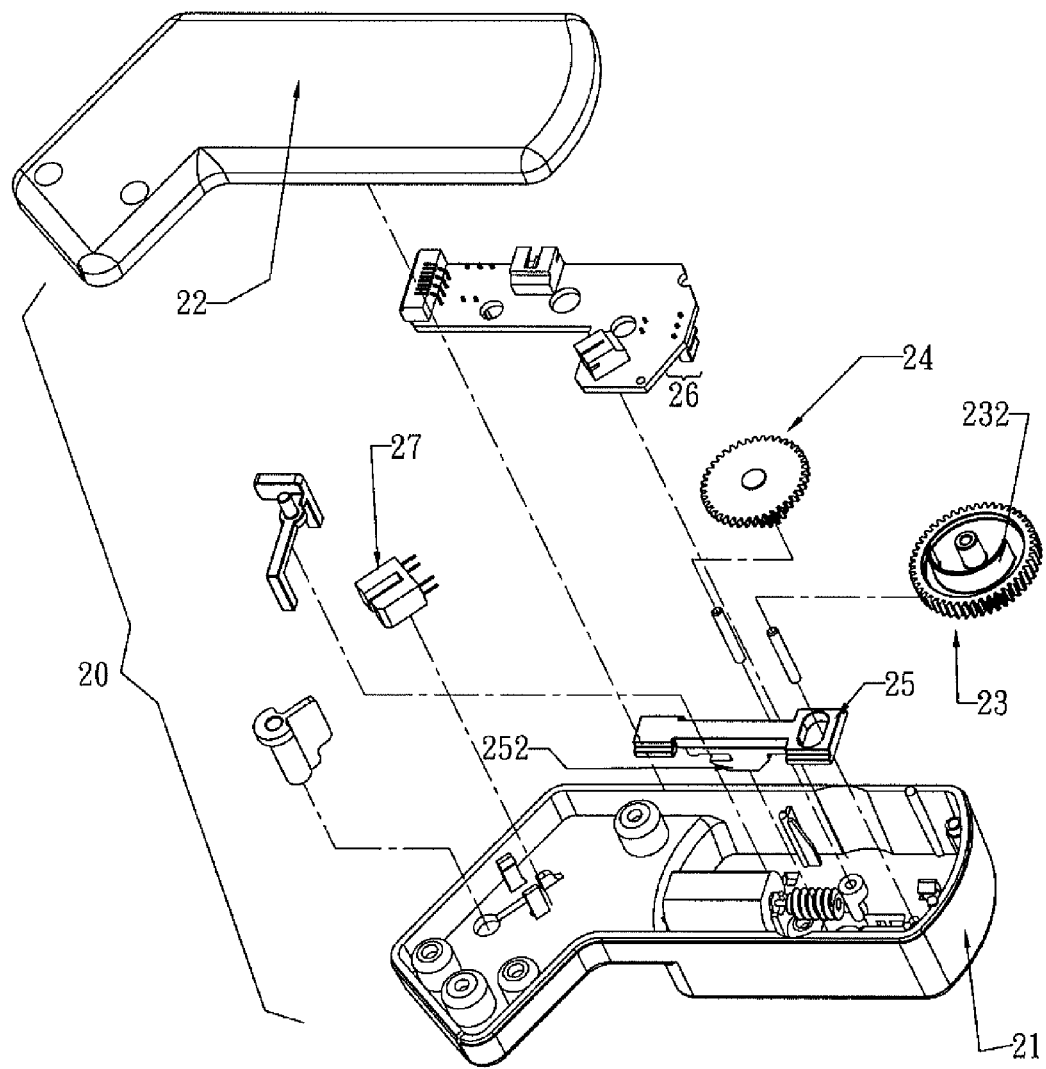
FIG. 7 is an exploded perspective view of the arm in accordance with the present invention.
Figure 8:
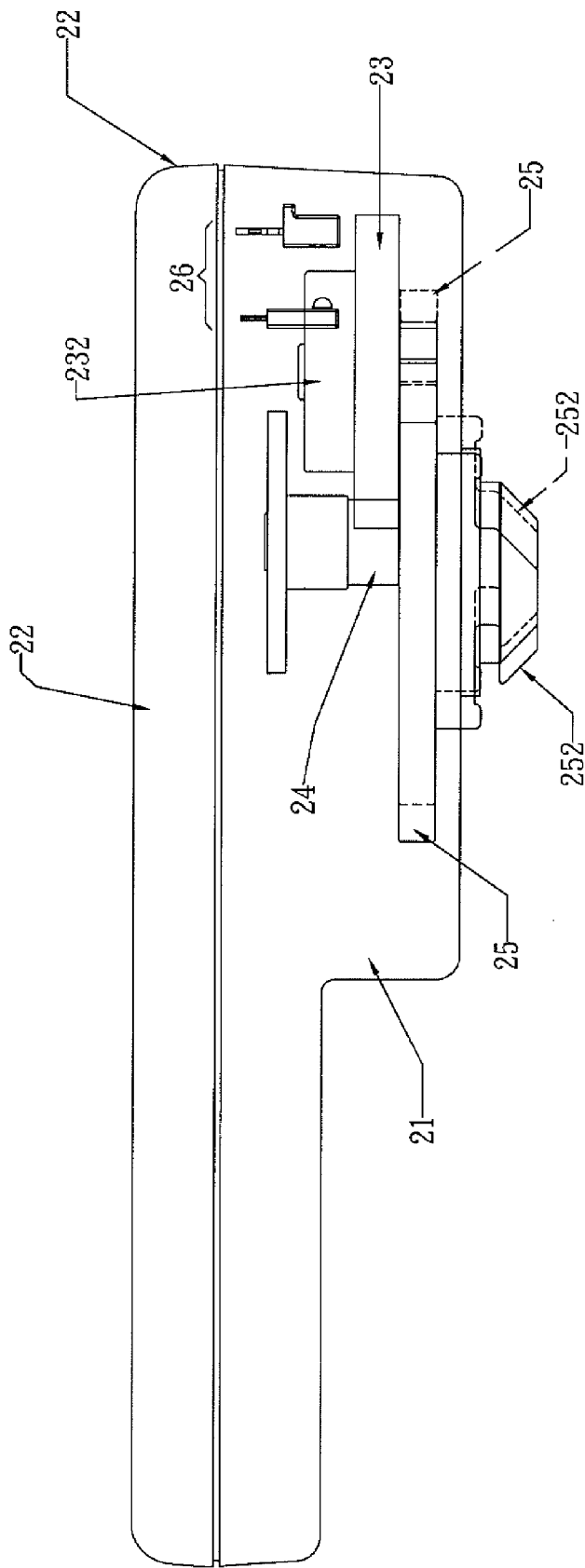
FIG. 8 is an operational side view of the arm in FIG. 7.

Referring to FIGS. 6 to 8, the arm 20 is connected to the conveying device 40 inside the transport mechanism 10 for moving individual disks between the disk holders 60 and 70, the drawer device 50 and the set of copy units. The control device automatically controls the various functions of various components of the automatic compact disk reproducing apparatus 1. In this embodiment, the arm 20 includes a main casing 21, an upper casing 22, a transmission element 23, a driving element 24, a pick 25, a set of detecting elements 26 and a sensor 27. The driving element 24 moves the transmission element 23 and the pick 25 to take a compact disk. The pick 25 has a hook 252 which is in the form of wedge in cross section for picking up a compact disk. The transmission element 23 has a flange 232 fitted to the set of detecting elements 26 for controlling the movements of the pick 25. The sensor 27 will give a signal for regulating the movement of the arm 20.

Referring to FIGS. 9 to 12, the drawer device 50 includes a disk tray 51, a driving mechanism 52, an attaching element 53, a swing element 54, an elastic element 55, a base 56 and a pivot element 57. The base 56 includes a front surface 560 and a rear surface 561. The front surface 560 of the base 56 includes a blocking edge 562 while the pivot element 57 is disposed on the rear surface 561 of the base 56. The disk tray 51 is disposed on the base 56 and aligned with the through hole 35 of the housing 30. The driving mechanism 52 is disposed at one side of the disk tray 51 for enabling the disk tray 51 to move back and forth along the base 56.

The base 56 is disposed with multiple sets of sensors a, a', b, b', c, c' and a pivot element 57. The driving mechanism 52 is formed with a blocking edge 520 located correspondingly to the sensors a, a', b, b' for detecting the position of the disk tray 51 relative to the base 55.

Figure 9:
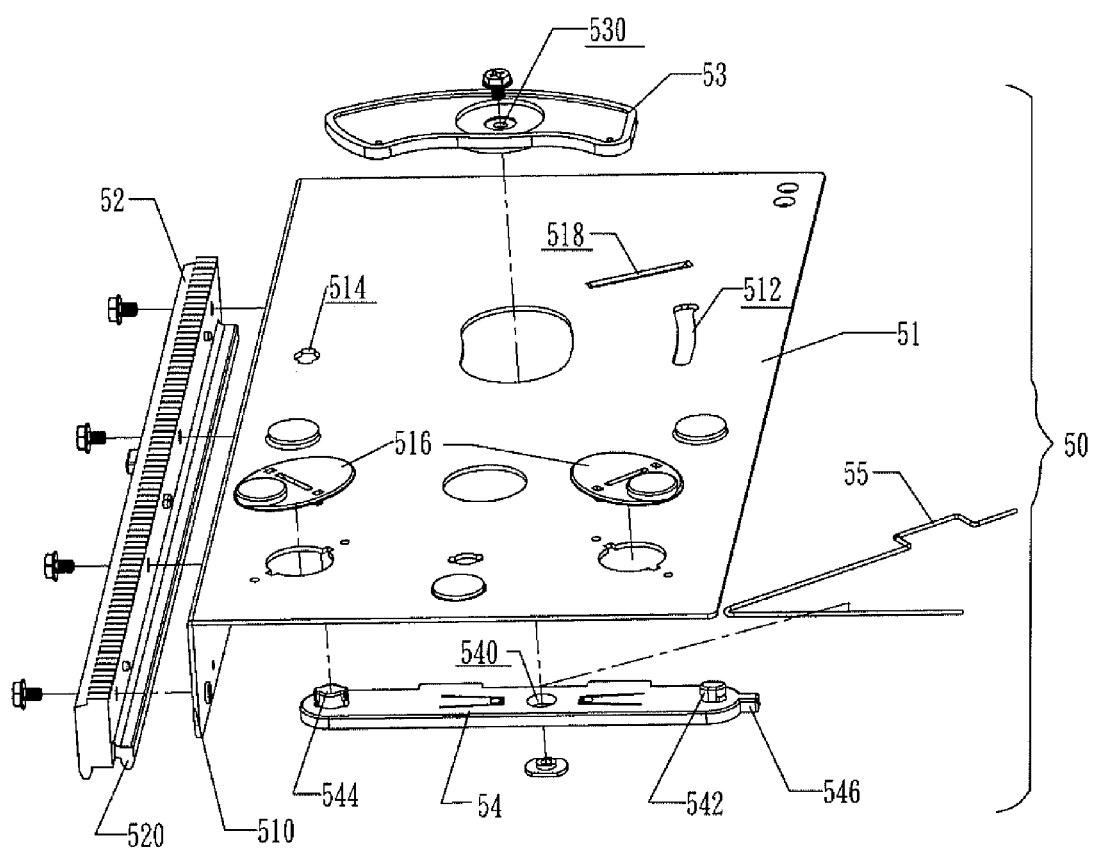
FIG. 9 is an exploded perspective view of a drawer device in accordance with the present invention.
Figure 10:
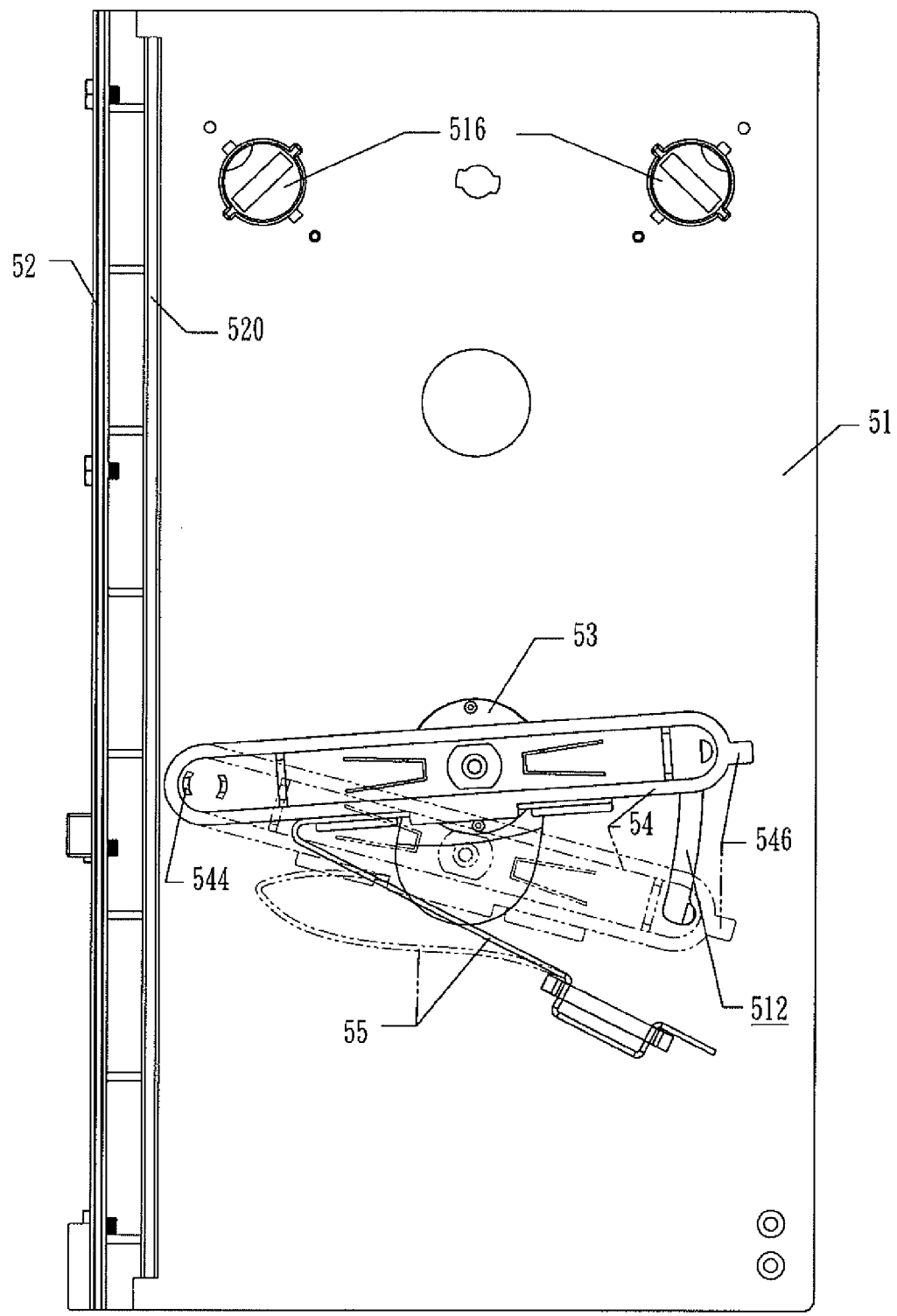
FIG. 10 is a bottom view of the drawer device in FIG. 9.

The attaching element 53 and the swing element 54 are located at the top and bottom of the disk tray 51 respectively, and the attaching element 53 and the swing element 54 are combined together and can be rotated relative to each other. In the present embodiment, as shown in FIG. 9, the attaching element 53 and the swing element 54 each are defined with a through hole 530, 540 in such a manner that the two through holes 530, 540 are aligned with each other. the attaching element 53 and the swing element 54 are combined together via through holes 530 and 540 of the attaching element 53 and the swing element 54 by a screw, and the attaching element 53 and the swing element 54 also can be rotatably combined together by other methods (such as rivet jointing or locking).

The structure of the attaching element 53 is designed according to the disks of different shapes and sizes (such as a circular disk with a diameter of 80 mm or 120 mm, or card-shaped disks), and as compared to the conventional apparatus for loading disks, the apparatus for loading disks of the present invention is more practical. On the disk tray 51 corresponding to the position of the disk are disposed plural disk attachments 516 for fixing the disk. For printing the disks of different shapes, it is only needed to change the disk attachments 516 and to rotate the attaching element 53 to clip the disk, and then printing can be carried out. Moreover, the disk attachments 516 are easy to change, and really can fix the disks of different shapes and sizes by cooperating with the attaching element 53.

An extending piece 510 extends from one side of the disk tray 51 for connecting with the driving mechanism 52, and the disk tray 51 further includes an arc-shaped sliding groove 512, a pivoting hole 514 and a locking groove 518. One end of the swing element 54 is formed with a pivoting post 544 to be inserted into the pivoting hole 514 of the disk tray 51, and the other end of the swing element 54 is formed with a protruded post 542 and a protrusion 546. The protruded post 542 is to be inserted in the sliding groove 512 of the disk tray 51, the protrusion 546 is to be abutted against the blocking edge 562 formed on the front surface 560 of the base 56 and the pivot element 57 disposed near the rear surface 561 of the base 56. One end of the elastic element 55 is locked in the locking groove 518 of the disk tray 51, and the other end of the elastic element 55 is abutted against the swing element 54 in such a manner that the swing element 54 and the attaching element 53 can be returned to the original positions after the disk is taken out. The pivot element 57 has a pivoting point 570 pivotally connected to the rear surface 561 of the base 56 and includes a blocking edge 572 located correspondingly to the sensors c, c'. When the protrusion 546 of the swing element 54 touches the pivot element 57, the blocking edge 572 of the pivot element 57 will block or connect the sensors c, c' to send out different signals, so as to detect whether the disk tray 51 is loaded with a disk or not.

Figure 11A:
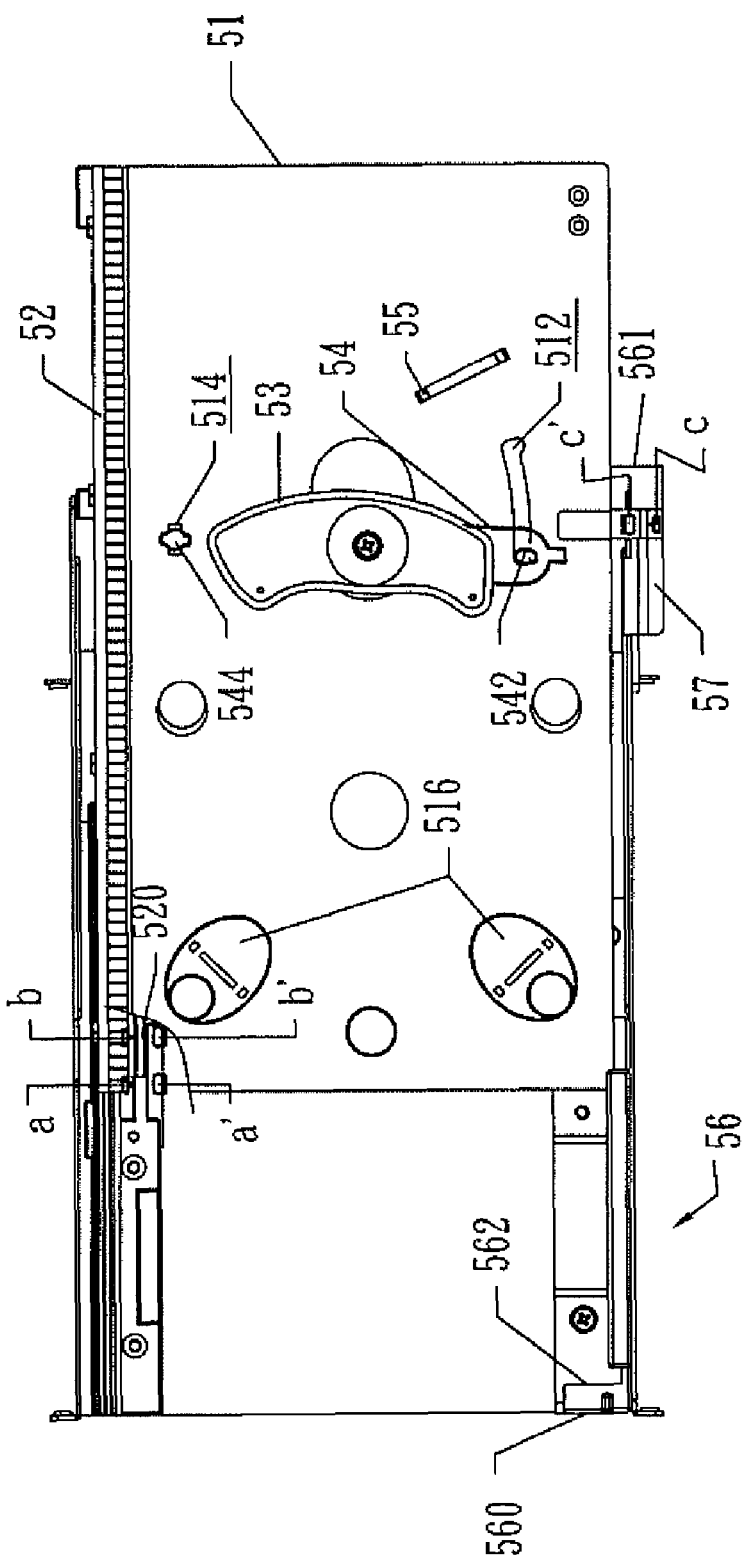
FIGS. 11A to 11D are operational top views of the of the drawer device.
Figure 12A:
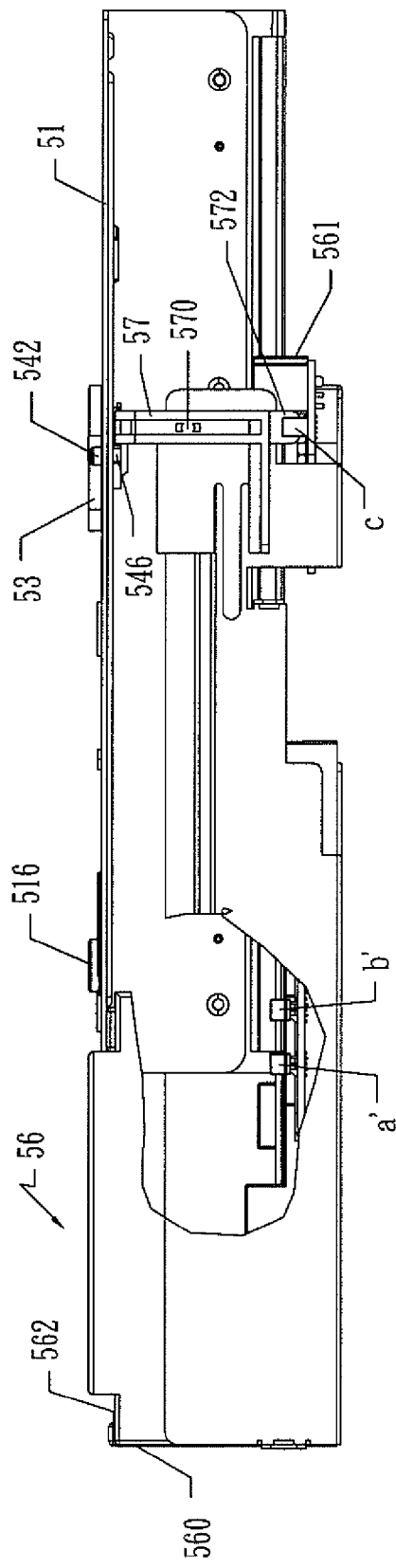
FIGS. 12A to 12D are operational side views of the drawer device.

Referring to FIGS. 11A and 12A, as can be clearly seen from FIG. 11A that when the drawer device 50 with no disk is loaded, the swing element 54 and the attaching element 53 will be fixed and will not push the pivot element 57 disposed near the rear surface 561 of the base 53 by the restriction of the elastic element 55, the protruded post 542 and the sliding groove 512. In this case, the blocking edge 547 of the pivot element 57 will block or connect the sensors c, c' to send out different signals, and to show that the disk tray 51 is not placed with a disk 80.

Figure 11B:
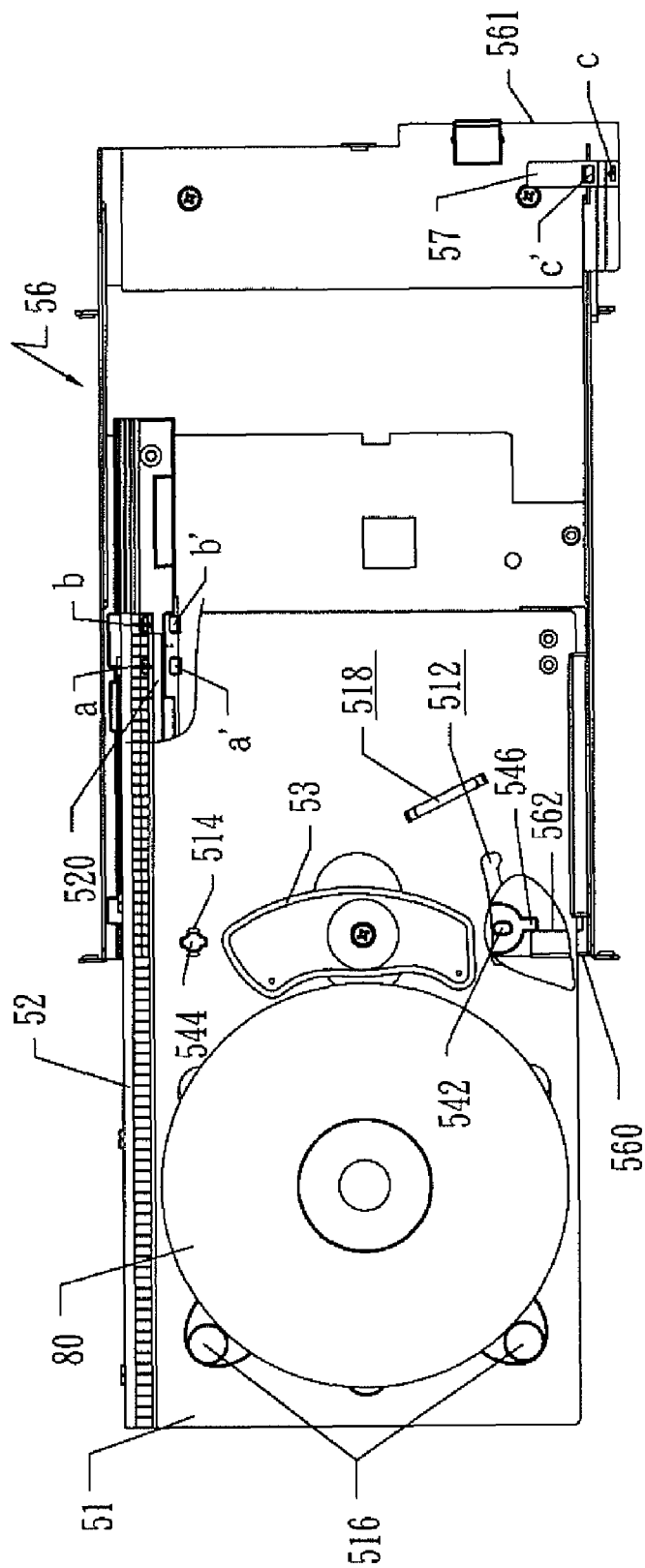
Figure 12B:
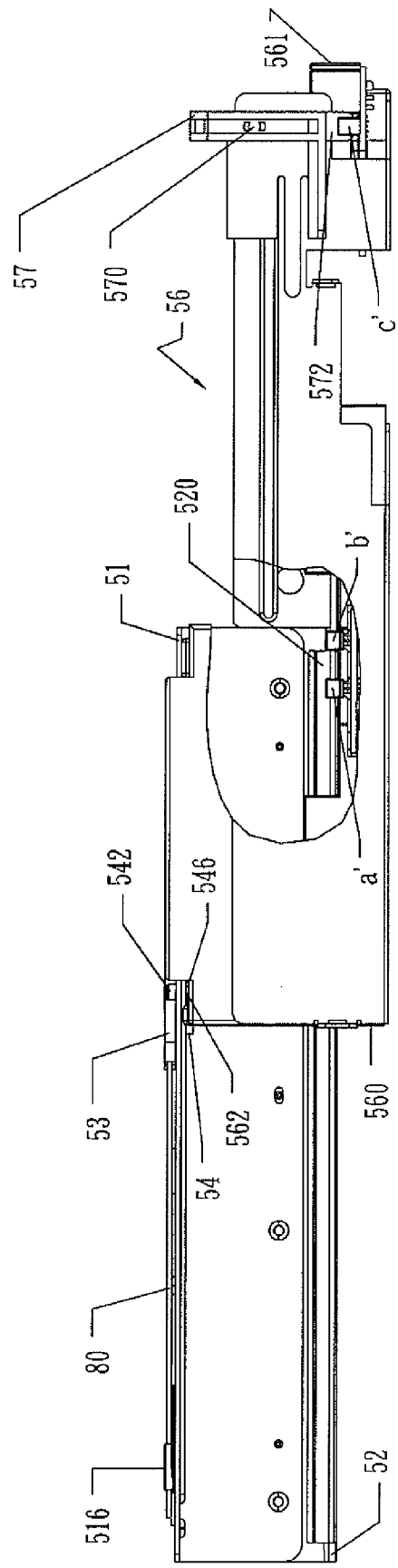

Referring to FIGS. 11B and 12B, when the drawer device 50 is placed with the disk 80, the attaching element 53 and the swing element 54 will be inward deviated to the inner side of the printing device along the sliding groove 512. And the disk 80 can be clipped and fixed to the disk tray 51 of the drawer device 50 by the elastic element 55.

The relative positions of the disk tray 51 of the drawer device 50 and the base 56 in different conditions is shown in FIGS. 11A-12D, the blocking edge 520 of the driving mechanism 52 is provided for blocking or connecting the sensors a, a', b, b' of the base 56 to send out different signals, so as to detect the position of the disk tray 51. In addition, the blocking edge 572 of the pivot element 57 can block or connect the sensors c, c' to send out different signals, so as to detect whether the disk tray 51 is loaded with the disk 80 or not.

FIGS. 11B and 12B show the relative position of the blocking edge 520 of the driving mechanism 52 and the sensors a, a', b, b' of the base 56, and the relative position of the protrusion 546 of the swing element 54 disposed at the bottom of the disk tray 51 and the blocking edge 562 of the front surface 560 of the base 56.

Figure 11C:
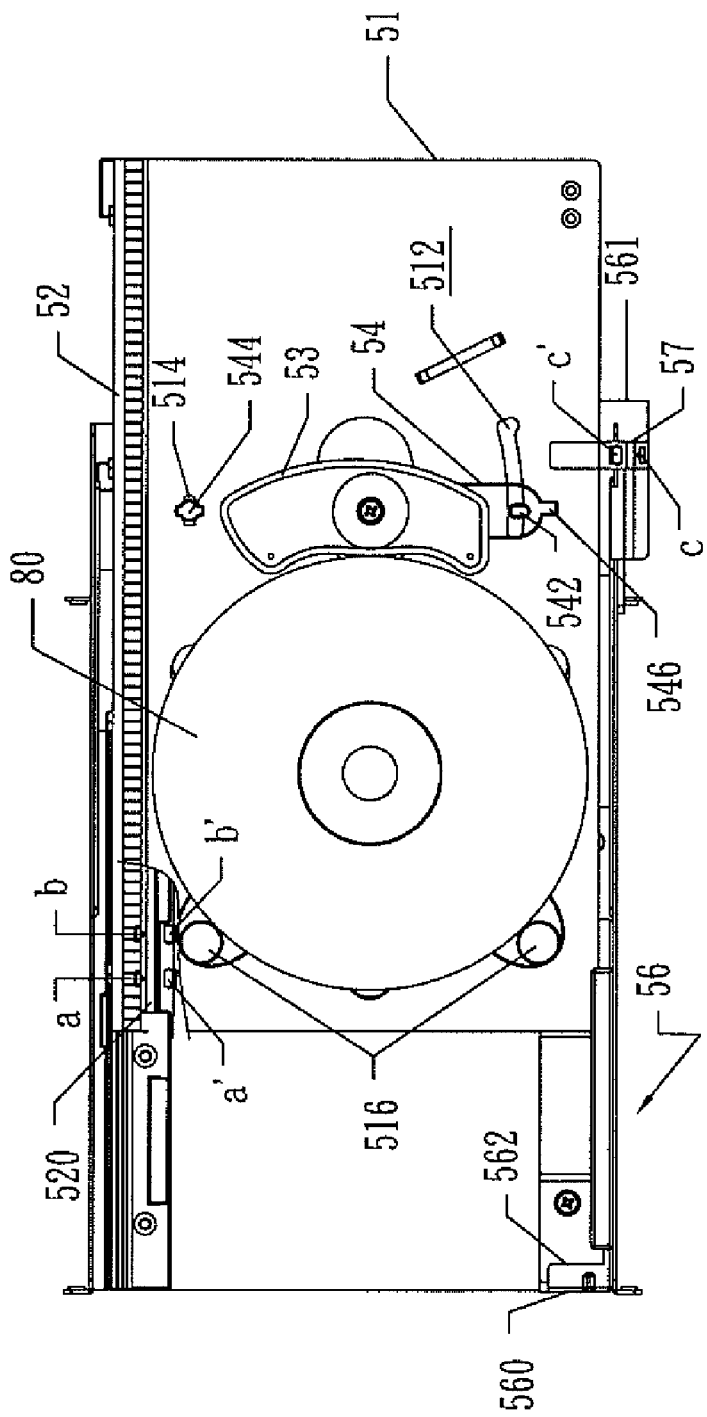
Figure 12C:
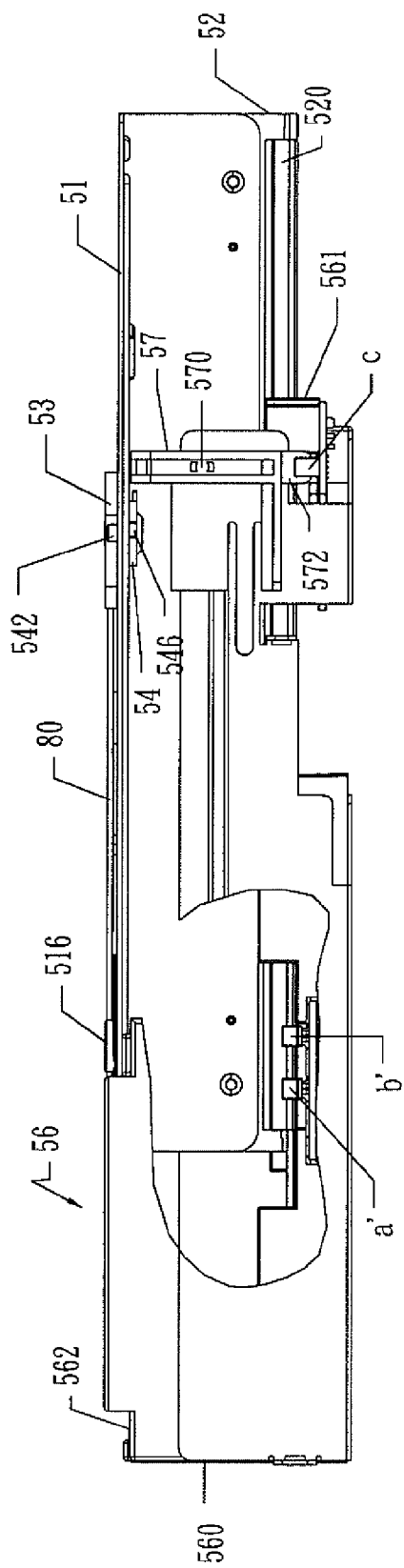
Figure 12D:
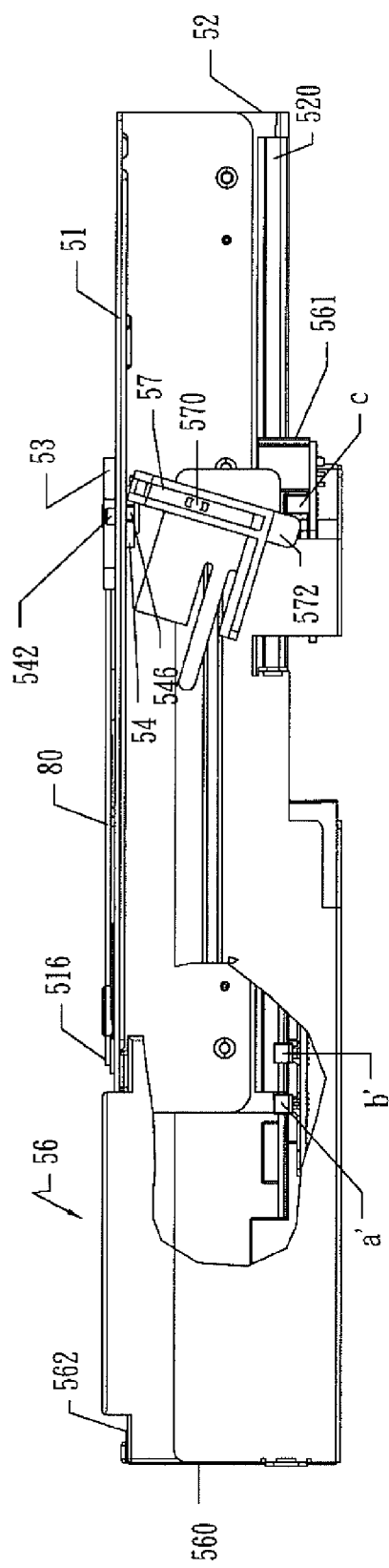

FIGS. 11C and 12C show the relative position of the blocking edge 520 of the driving mechanism 52 and the sensors a, a', b, b' of the base 56, and the relative position of the pivot element 57 disposed near the rear surface 561 of the base 56 and the sensors c, c' of the base when the drawer device 50 placed with the disk moves into the printing device.

Figure 11D:
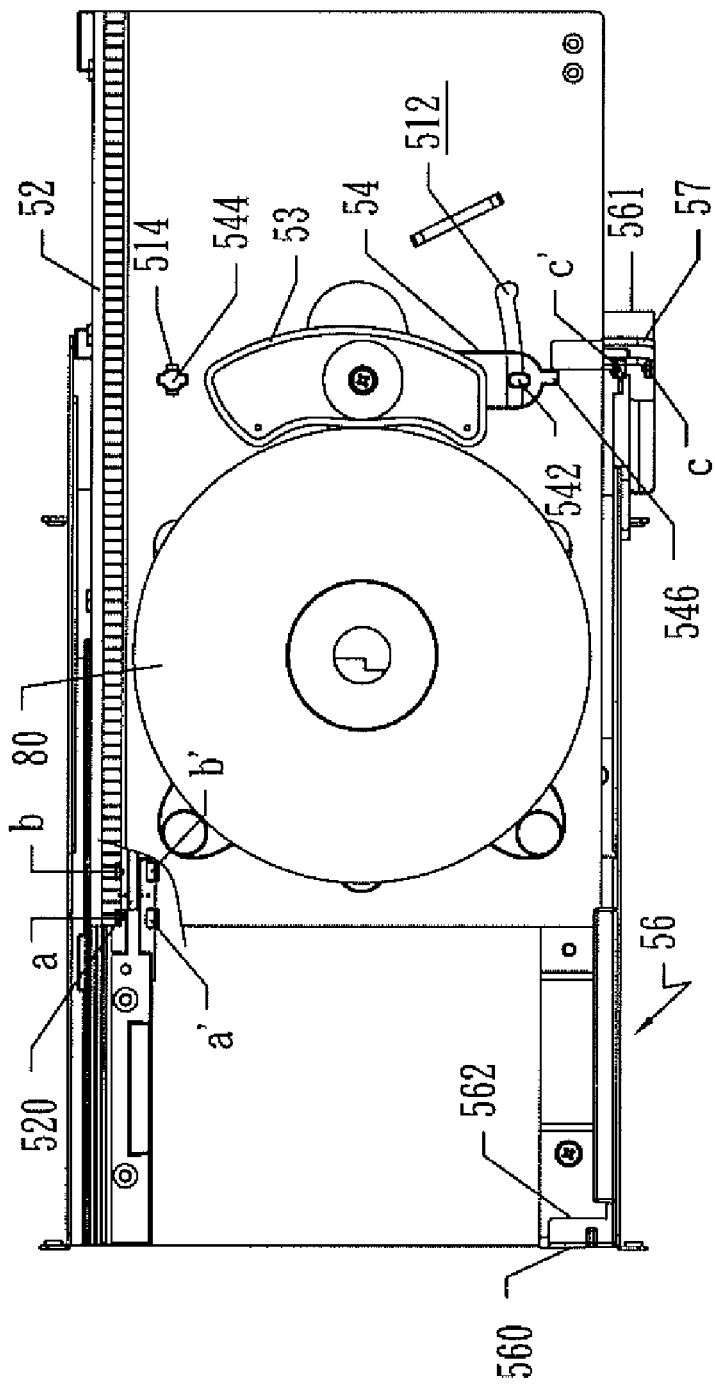

Referring to FIGS. 11A and 11D, when the drawer device 50 loaded with the disk 80 is pushed from the rear side of the printing device, the protrusion 546 of the swing element 54 disposed at the bottom of the disk tray 51 will push the pivot element 57 disposed near the rear surface 561 of the base 56. The blocking edge 520 of the driving mechanism 52 will connect the sensors a, a', b, b' of the base 56 to send out different signals, so as to show the direction of pushing the disk tray 51. Further, the protrusion 546 of the swing element 54 disposed at the bottom of the disk tray 51 will push the pivot element 57, such that the blocking edge 572 of the pivot element 57 will block or connect the sensors c, c' to send out different signals, so as to show that the disk tray 51 is loaded with the disk 80.

Referring to FIGS. 1 and 6, the disk holder 60 is mounted on outer side of the set of casings of the transport mechanism 10, and the disk holder 60 includes a bracket 61 which is detachably assembled to the transport mechanism 10, a supporting member 62 and a spindle holding 63 placed between the bracket 61 and the supporting member 62.

The disk holder 70 is mounted between the transport mechanism 10 and the housing 30 and includes a base member 71 and two disk posts 72 as supporting member for holding compact disks as a stack. The base member 71 is defined with a notch in a bottom thereof for facilitating carrying of the disk holder 70.

The main components and other components of the apparatus 1 are demountable from the housing 30. Those main components can be the transport mechanism 10, the disk holders 60 and 70. Consequently, assembling and maintaining the apparatus 1 is convenient, and manufacturing cost is low. Also, repairing the apparatus 1 is convenient.

Further, the apparatus 1 does not need a large space to transport the compact disks including unrecorded disks and recorded disks. Therefore, the apparatus 1 is convenient to use.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system for duplication of data onto disks comprising a housing, a drawer device, a transport mechanism, at least two disk holders, and an arm wherein:
   a print device and a set of copy units are mounted inside the housing, the set of copy units are duplicating devices with a tray, at least one of the duplicating devices is a burner, the housing comprises a through hole;
   the drawer device is assembled in the housing and aligned with the through hole of the housing, so that the drawer device extends out of the housing through the through hole;
   the transport mechanism comprises a set of casings, a threaded rod and a conveying device;
   the set of casings of the transport mechanism include a front casing, a rear casing, a top cover and a sliding plate, the front casing has an opening near its top edge, a vertical slot is formed between the front casing and the rear casing, an inside of the rear casing has a sliding slot and a gliding slot, the sliding plate has a lengthwise slot and a ranking slot, the lengthwise slot is fitted with the sliding slot, a set of power transmission members are coupled to a driving unit and disposed on the casings, the top cover is covered on both top ends of the front and the rear casings, and one end of the threaded rod is pivotally connected to the top cover while the other end of the threaded rod is drivingly connected to the set of power transmission members;
   the conveying device includes a fixing plate, a conveying element, a gliding element, and a combination plate, the conveying element has a spiral ridge, and the combination plate is fitted to the threaded rod, the fixing plate and the combination plate are mounted on both sides of the conveying element, the fixing plate extends out of the vertical slot, the conveying element has a protrusion fitted to the sliding slot, the lengthwise slot and the ranking slot, the gliding element has a protruding part fitted to the gliding slot and has two extending plates fitted onto both sides of the gliding element;
   the disk holders are arranged to correlate with the transport mechanism, the print device and the set of copy units; and
   the arm is provided with a pick at one end thereof, and the other end of the arm is connected to the fixing plate and driven by the conveying device.

2. The system for duplication of data onto disks as claimed in claim 1, wherein the conveying device further comprises a damping element disposed on the extending plates of the gliding element and fitted to the conveying element.

3. The system for duplication of data onto disks as claimed in claim 1, wherein the gliding slot of the rear casing further comprises a sensor and a fitting member for the sensor, when the fitting member is touched, the sensor will give a signal for reducing an upward movement of the arm by nearing a top of the transport mechanism.

4. The system for duplication of data onto disks as claimed in claim 1, wherein the drawer device includes a base disposed with multiple sets of sensors, a disk tray, a driving mechanism, an attaching element, a swing element, an elastic element and a pivot element;
   the base includes a front surface and a rear surface, the front surface of the base includes a blocking edge, the pivot element is disposed on the rear surface of the base;
   the disk tray is disposed on the base and aligned with the through hole of the housing, an extending piece extends from one side of the disk tray, and the disk tray further includes an arc-shaped sliding groove, and a pivoting hole;
   the driving mechanism is connected to the extending piece of the disk tray for enabling the disk tray to move back and forth along the base, the sensors are provided for detecting a position of the disk tray relative to the base, the driving mechanism is formed with a blocking edge located correspondingly to the sensors;
   the attaching element and the swing element are located at a top and a bottom of the disk tray respectively, and the attaching element and the swing element are combined together and allowed to be rotated relative to each other, one end of the swing element is formed with a pivoting post to be inserted into the pivoting hole of the disk tray, and the other end of the swing element is formed with a protruded post and a protrusion, the protruded post is to be inserted in the sliding groove of the disk tray, the protrusion is to be abutted against the blocking edge of the base and the pivot element of the base;

one end of the elastic element is locked to the disk tray, and the other end of the elastic element is abutted against the swing element;

the pivot element has a pivoting point pivotally connected to the rear surface of the base and includes a blocking edge located correspondingly to the sensors, when the protrusion of the swing element touches the pivot element, the blocking edge of the pivot element will block or connect the sensors to send out different signals, so as to detect whether the disk tray is loaded with a disk or not.

5. The system for duplication of data onto disks as claimed in claim 4, wherein the attaching element and the swing element each are defined with a through hole in such a manner that the two through holes are aligned with each other.

6. The system for duplication of data onto disks as claimed in claim 4, wherein plural disk attachments are disposed on the disk tray correspondingly to a position of a disk.

7. The system for duplication of data onto disks as claimed in claim 4, wherein the disk tray further includes a locking groove, and the one end of the elastic element is locked in the locking groove of the disk tray.

8. The system for duplication of data onto disks as claimed in claim 1, wherein the housing has a panel which comprises a display device and several buttons.

9. The system for duplication of data onto disks as claimed in claim 8, wherein the panel is mounted on a front side of the housing.

10. The system for duplication of data onto disks as claimed in claim 1, wherein the housing has a cover plate for maintaining the printing device.

11. The system for duplication of data onto disks as claimed in claim 10, wherein the cover plate is on a top side of the housing.

12. The system for duplication of data onto disks as claimed in claim 1, wherein the arm includes a main casing, an upper casing, a transmission element, and a driving element, the driving element moves the transmission element and the pick to take a compact disk, the pick has a hook for picking up a compact disk.

13. The system for duplication of data onto disks as claimed in claim 12, wherein the arm further includes a set of detecting elements and a sensor, the transmission element has a flange fitted to the set of detecting elements for controlling movements of the pick, the sensor will give a signal for regulating a movement of the arm.

14. The system for duplication of data onto disks as claimed in claim 12, wherein the hook is in the form of wedge in cross section.

15. The system for duplication of data onto disks as claimed in claim 12, wherein one of the disk holders is mounted on outer side of the set of casings of the transport mechanism.

16. The system for duplication of data onto disks as claimed in claim 12, wherein the one of the disk holders includes a bracket which is detachably assembled to the transport mechanism, a supporting member and a spindle holding placed between the bracket and the supporting member.

17. The system for duplication of data onto disks as claimed in claim 1, wherein the other of the disk holders is mounted between the transport mechanism and the housing.

18. The system for duplication of data onto disks as claimed in claim 17, wherein the other of the disk holders includes a base member and two disk posts as supporting member for holding compact disks as a stack.

19. The system for duplication of data onto disks as claimed in claim 18, wherein the base member is defined with a notch in a bottom thereof.

* * * * *